US 009330384B2

(12) United States Patent
    Scipioni

(10) Patent No.: US 9,330,384 B2
(45) Date of Patent: May 3, 2016

(54) IN-STORE CARD ACTIVATION

(71) Applicant: PAYPAL, INC., San Jose, CA (US)

(72) Inventor: German Scipioni, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 13/930,481

(22) Filed: Jun. 28, 2013

(65) Prior Publication Data

US 2014/0061299 A1    Mar. 6, 2014

Related U.S. Application Data

(60) Provisional application No. 61/696,593, filed on Sep. 4, 2012.

(51) Int. Cl.
    *G06K 5/00*      (2006.01)
    *G06Q 20/34*     (2012.01)
    *G07F 7/10*      (2006.01)

(52) U.S. Cl.
    CPC ............ *G06Q 20/354* (2013.01); *G06Q 20/355* (2013.01); *G07F 7/1008* (2013.01)

(58) Field of Classification Search
    USPC ......... 235/380, 487, 379, 492, 493, 375, 382, 235/494, 449, 462.01; 705/39, 35, 44, 41, 705/16, 17, 64, 42; 379/121.01, 114.19
    See application file for complete search history.

(56) References Cited

U.S. PATENT DOCUMENTS

| 2012/0292388 A1* | 11/2012 | Hernandez | 235/379 |
| 2013/0166441 A1* | 6/2013 | Kobylkin et al. | 705/39 |
| 2013/0211935 A1* | 8/2013 | Brenny et al. | 705/17 |
| 2013/0325682 A1* | 12/2013 | Hakel | 705/35 |

* cited by examiner

*Primary Examiner* — Christle I Marshall
(74) *Attorney, Agent, or Firm* — Haynes and Boone, LLP

(57) ABSTRACT

A user having an account with a payment provider is able to go to a store or merchant location and pick an unregistered payment card associated with the payment provider. The card may have a magnetic strip encoded with a number unique to the card and a machine readable code, such as a QR/barcode, embossed thereon. The card may or may not have a corresponding number embossed or printed on the card. Once a card is selected, the user may open an application on the user's mobile smart phone or other device to scan or otherwise capture the number associated with the card. The user may scan the QR/barcode, take a picture of the number, speak the number into the device, or even manually enter the number into the user's device. The user, either before or after the number capture, also authenticates with the payment provider, such as by entering login credentials, which may include a password/PIN and a user identifier if needed. The user may then confirm a request to associate or link the scanned card with the user's payment provider account. Once done, the card is now activated and linked to the user account so that the user can immediately use the card for purchases.

16 Claims, 4 Drawing Sheets

IN-STORE CARD ACTIVATION

CROSS REFERENCE TO RELATED APPLICATION

Pursuant to 35 U.S.C. §119(e), this application claims priority to the filing date of U.S. Provisional Pat. Application Ser. No. 61/696,593, filed Sep. 4, 2012, which is incorporated by reference in its entirety.

BACKGROUND

1. Technical Field

The present application generally relates to payment cards, and in particular, to activating payment cards.

2. Related Art

Currently, users of payment services, such as PayPal, Inc. of San Jose, Calif., can obtain a payment card that enables the user to make a purchase at a physical point of sale (POS) by swiping the payment card through a card reader. Such cards typically have a magnetic strip that allows a POS reader to read information contained in the strip, such as a card or account number. This information is communicated to the card provider or other service provider for processing the payment.

Typically, a user is sent a card through the mail, with an embossed account number as well as a magnetic strip encoded with the account number. Because the card is mailed, it may take the user several days to receive the card, resulting in a delay for the user to use the card for payments.

DETAILED DESCRIPTION

In one embodiment, a user having an account with a payment provider, such as PayPal, Inc. of San Jose, Calif., is able to go to a store or merchant location and pick an unregistered payment card associated with the payment provider. The card may have a magnetic strip encoded with a number unique to the card and a machine readable code, such as a QR/barcode, embossed thereon. The card may or may not have a corresponding number embossed or printed on the card. Once a card is selected, the user may open an application on the user's mobile smart phone or other device to scan or otherwise capture the number associated with the card. For example, the user may scan the QR/barcode, take a picture of the number, speak the number into the device, or even manually enter the number into the user's device. The user, either before or after the number capture, also authenticates with the payment provider, such as by entering login credentials, which may include a password/PIN and a user identifier if needed. The user may then confirm a request to associate or link the scanned card with the user's payment provider account. Once done, the card is now activated and linked to the user account so that the user can immediately use the card for purchases, which is different from gift cards in stores that require the user to activate during checkout or payment, with no association to a payment account.

Figure 1:
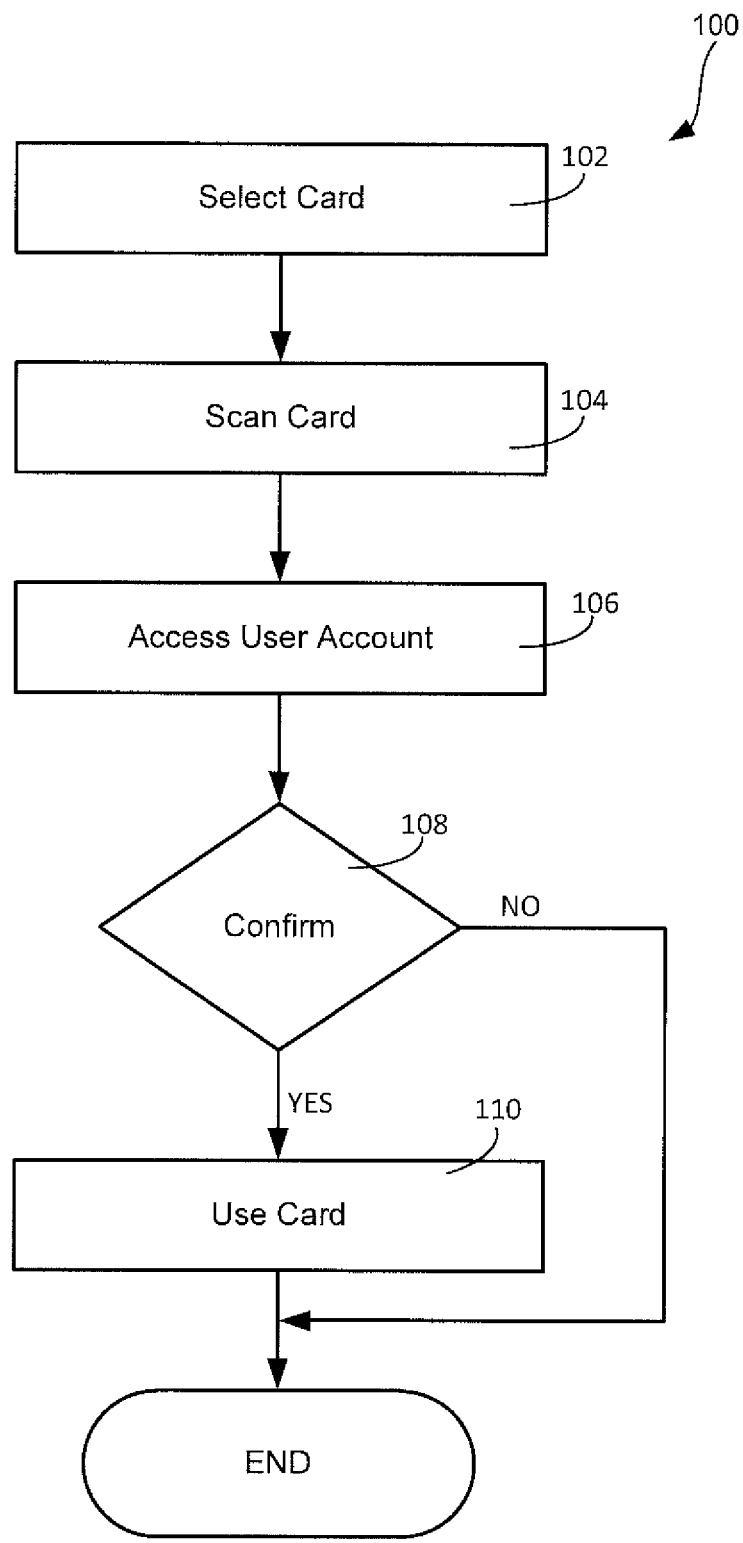
FIG. 1 is a flowchart showing steps a user performs in receiving and activating a payment card according to one embodiment.

FIG. 1 is a flowchart 100 showing a process a user performs in activating a payment card at a store or other physical location. At step 102, the selects a physical payment card. The payment card can be made available at a store, merchant location, kiosk, or other physical location. For example, a store may have a stack of cards at an entrance of the store. Note that because the cards are not activated or available for use, the cards do not need to be secured or monitored. The cards may have a magnetic strip, NFC chip, or other means to enable card information to be read for conducting a payment transaction with the store or others through a payment provider, such as PayPal, Inc. of San Jose, Calif. The cards may also have one or more of a QR code, barcode, machine readable image or code, or embossed or printed numbers. The QR/barcodes contain a unique number associated with the particular card. The embossed or printed numbers represent a unique card number, which may be the same or different than the ones contained in the QR/barcode.

Once the user selects a card, which can be any available payment card at the store, the user scans or otherwise captures information from the card at step 104. For example, the user may scan the QR/barcode with a user device, such as a smart phone. The user may also take a picture of a printed or embossed number or enter the number manually by keyboard or voice. In other embodiments, the user may enter a URL with a code associated with the card.

At step 106, the user accesses the user's account with the payment provider. Note that steps 104 and 106 may be performed in different orders or combined. Accessing the account may include the user entering a PIN or password, along with a user identifier if needed. In one embodiment, the user opens a mobile application for the payment provider and enters in the user PIN/password. The user identifier may already be available through the mobile device, but if not, the user may also be asked to enter a user name, email address, phone number, or other user identifier. This allows the payment provider to access the user's account. If the user has not set a mobile PIN, the user may be requested to create one or a mobile PIN may be created by the payment provider, such as through the user password.

After the payment provider has located and accessed the user's account, at step 108, the user may see a message asking the user to confirm activating the just-scanned card. The message may be through a push notification, through an email, or other text message delivered to the user device used to communicate the card information at step 104. The message may also be communicated by voice, such as through a voice message or call to the user device. Confirmation may be communicated back to the service provider in any number of suitable ways, such as, but not limited to selecting a button (e.g., confirm, yes, activate, etc.) or checking a box from the user device display, sending a text message, or through voice, such as a call to the payment provider.

Once confirmed, the card can now be used to make a purchase at the store or other stores. For example, at step 110, the user may use the card by taking desired items from the store to a checkout area, having the items totaled, and scanning the card, either before, during, or after the items are totaled. The user may swipe the card through a card reader at the point of sale or checkout area and enter a PIN or password on the POS device. The card information is communicated to the payment provider, who then processes the payment through the user's payment provider account. As discussed below, the card may have associated incentives or other funding instruments associated with it, such that any applicable incentives may be automatically applied to the purchase. In other embodiments, the user may be notified that there are incentives available for use with the purchase and asked which one(s) the user wishes to use for this transaction. Non-used incentives may be kept pending for future payment transactions, based on eligibility, such as expiration date and other incentive conditions.

As a result, a payment provider user is able to quickly and easily activate a payment card in a store and make a purchase immediately. This eliminates the need for the user to wait for a card in the mail or go through an activation process at checkout.

Figure 2:
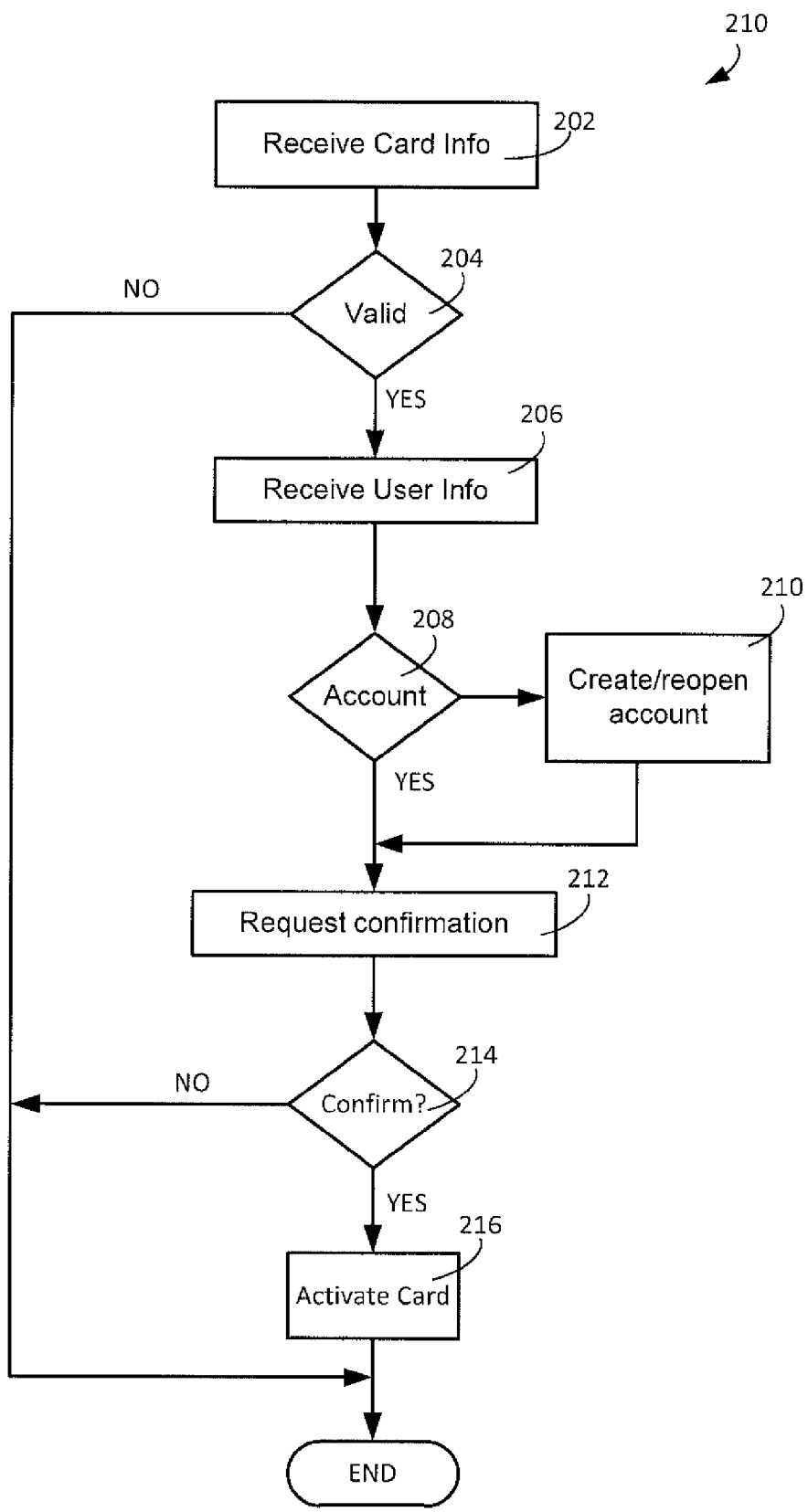
FIG. 2 is a flowchart showing steps a payment provider performs in activating a payment card according to one embodiment.

FIG. 2 is a flowchart 200 showing a process a payment provider makes in activating a card from a store according to one embodiment. At step 202, card information is received from a user device at a store or other location. The information may be received through a scan of a QR/barcode, a picture of a card number, or entered (text or voice) numbers of the card. The received information contains, at a minimum, a card identifier that uniquely identifies the particular card to the payment provider. Other card information may include data that associates the card with the payment provider, data that associates a store, merchant, or location with the card, or security codes to identify real versus counterfeit cards. These may help the payment provider identify valid and authentic cards.

In other embodiments, card information may include incentive information used to incentivize the user to use/activate the card. The incentive information may be a credit to the user's payment provider account, credit applied to a purchase at the store of activation, or any other desirable incentive. For example, specific store coupons, general rebates/credits, manufacturer coupons, etc. may be part of the card information, so that the various incentives may be downloaded or applied to the user's account upon card activation.

After card information is received, a determination is made, at step 204, whether the card is valid or authentic. The payment provider may search its database to determine whether the received card identifier matches with a card actually issued by the payment provider. An invalid card may a counterfeit card that does not have the proper security code, one that does not have a match with the payment provider (which may be due to an improper card identification capture), or a card that has already been activated and associated with another user's account. In another example, an invalid card may be the result of a location mismatch. The card identifier may be associated with a card for Store A at 123 Main Street, Los Angeles, Calif., but the identifier may be transmitted from a user device in New York or somewhere outside the U.S. In that case, the payment system may determine the card cannot be validated at this time.

Depending on the reason for invalidity, the payment provider may take appropriate action, such as informing the user to select another card and return the current card to the store or clerk or request the user to capture the card identification again. If the payment provider does not receive card information for a valid card determination, the activation process may be terminated.

At step 206, the payment provider receives user information, which may include a PIN or password and a user identifier, such as an email address, user name, or phone number, if needed. The user identifier may not be needed if a suitable identifier is communicated automatically (e.g., without user entry) through the user device, such as a phone number or device ID. The user information may be received through a mobile app on the user device.

The user information is used to determine, at step 208, whether a valid account exists corresponding to the user information. If an account associated with the user identifier is found, but the password/PIN is incorrect, the user may be asked to reenter and send user information, such as the password/PIN. If an account was found, but the account is inactive, such as an expired funding source, the user may be asked to update information, such as an expiration date, to reopen or activate the account at step 210. If no account is found, the user may be asked to open or create an account at step 210 by entering or providing requested information, such as a user name, password/PIN, funding source information, etc. Note that the sequence of steps 204 and 206-210 may be interchanged, such that the user first accesses or opens an account and then scans or captures payment card information.

Once the scanned card is found valid and the user has a valid account with the payment provider, the payment provider may, optionally, request whether the user wishes to activate or link the card to the user's account. This may be communicated electronically to the user device in the form of a text message or display having a button, field, or link the user can select to indicate confirmation. Voice notification may also be suitable.

If the user confirms, the card is activated at step 216. Activation may include storing card information with other information in the user's account. As such, when the user scans the card for a payment, the card information, along with authentication information such as a password/PIN, can be communicated to the payment provider. The payment provider may then process a payment on behalf of the user. Note that one or more steps described herein may be omitted, combined, or performed in a different sequence as desired.

In one embodiment, the card identifier number is the same as the card number used by merchants and the payment provider for making a payment, i.e., the card identifier contained in the QR code/barcode is the same as what is contained in the magnetic strip, NFC chip, or embossed/printed card number. In another embodiment, the card identifier is different than the actual card number. Thus, the card identifier may be used simply to initially identify and activate the card, while the card number (such as contained in a magnetic strip, NFC chip, or embossed/printed on the card) is used to identify the user account in payment transactions.

By allowing a payment provider to supply locations with unactivated payment cards that can be easily activated by user's through their mobile device, payment providers may save on costs of mailing activated cards to user, save time on processing individual cards, and reach more current and potential account holders to use the payment card for purchases.

In other embodiments, the card may be activated at the POS, such as by scanning the card and using the card at the POS. In this case, the merchant may get credit for selling the card, with the merchant able to charge the user a fee (such as $2) for "purchasing" the card. The payment provider may provide the user with a credit in the amount of the fee (e.g., $2) such that the user is made whole, but the merchant still receives a bonus for selling the card at the merchant location.

Figure 3:
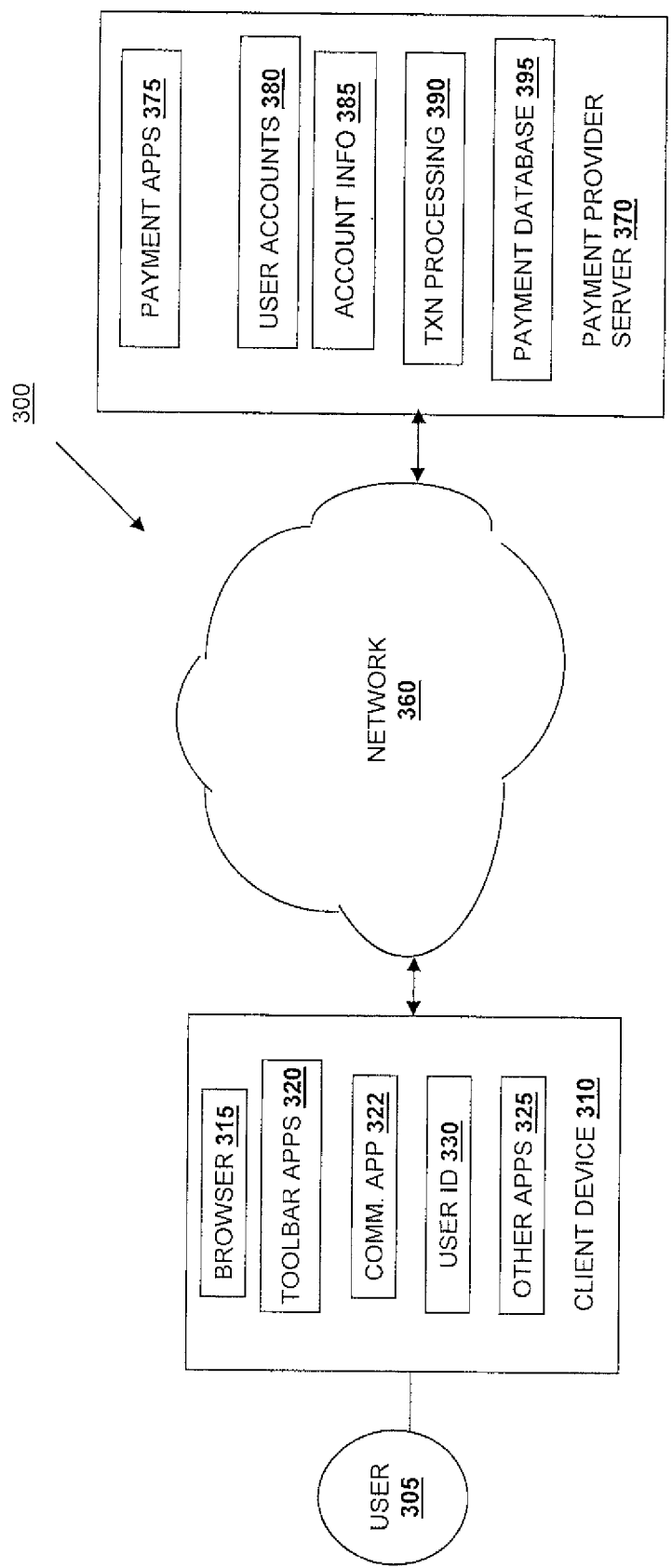
FIG. 3 is a block diagram of a networked system configured for activating a payment card at a merchant store according to one embodiment.

FIG. 3 is a block diagram of a networked system 300 configured for activating a payment card, such as described above, in accordance with an embodiment of the invention. System 300 includes a user device 310 and a payment provider server 370 in communication over a network 360. Payment provider server 370 may be maintained by a payment provider, such as PayPal, Inc. of San Jose, Calif. Although a payment provider device is shown, the server may be managed or controlled any suitable service provider that manages activation of a payment or funding card. A user 305 utilizes user device 310 to view account information and perform transactions using payment provider server 370, including activating a payment card in-store and using the card for payments. Note that transaction, as used herein, refers to any suitable action performed using the user device, including payments, transfer of information, display of information, etc. Although only one server is shown, a plurality of servers may be utilized. Exemplary servers may include, for example, stand-alone and enterprise-class servers operating a server OS such as a MICROSOFT® OS, a UNIX® OS, a LINUX® OS, or other suitable server-based OS. One or more servers may be operated and/or maintained by the same or different entities.

User device 310 and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

User device 310 may be implemented using any appropriate hardware and software configured for wired and/or wireless communication over network 360. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 310 may include one or more browser applications 315 which may be used, for example, to provide a convenient interface to permit user 305 to browse information available over network 360. For example, in one embodiment, browser application 315 may be implemented as a web browser or mobile browser configured to view information available over the Internet, such as account information from the payment provider. User device 310 may also include one or more toolbar applications 320 which may be used, for example, to provide client-side processing for performing desired tasks in response to operations selected by user 305. In one embodiment, toolbar application 320 may display a user interface in connection with browser application 315 as further described herein.

User device 310 may further include other applications 325 as may be desired in particular embodiments to provide desired features to user device 310. For example, other applications 325 may include security applications for implementing client-side security features, programmatic client applications for interfacing with appropriate application programming interfaces (APIs) over network 360, or other types of applications. Applications 325 may also include email, texting, voice and IM applications that allow user 305 to send and receive emails, calls, and texts through network 360, as well as applications that enable the user to communicate and transfer information through and with the payment provider as discussed above. User device 310 includes one or more user identifiers 330 which may be implemented, for example, as operating system registry entries, cookies associated with browser application 315, identifiers associated with hardware of user device 310, or other appropriate identifiers, such as used for payment/user/device authentication. In one embodiment, user identifier 330 may be used by a payment service provider to associate user 305 with a particular account maintained by the payment provider. A communications application 322, with associated interfaces, enables user device 310 to communicate within system 300.

Payment provider server 370 may be maintained, for example, by an online payment service provider which may provide information to and receive information from user 305, such as for making payments and other payment related services. In this regard, payment provider server 370 includes one or more payment applications 375 which may be configured to interact with user device 310 over network 360 to facilitate sending payments on behalf of user 305 of user device 310.

Payment provider server 370 also maintains a plurality of user accounts 380, each of which may include account information 385 associated with consumers, merchants, and funding sources, such as credit card companies. For example, account information 385 may include private financial information of users of devices such as account numbers, passwords, device identifiers, user names, phone numbers, credit card information, bank information, payment provider issued card information, or other information which may be used to facilitate transactions by user 305.

A transaction processing application 390, which may be part of payment application 375 or separate, may be configured to receive information from a user device for processing and storage in a payment database 395. Transaction processing application 390 may include one or more applications to process information from user 305 for processing a payment or transfer using various selected funding instruments or cards, including a card issued by the payment provider. As such, transaction processing application 390 may store details of payment transfer from individual users, including funding source(s) used, credit options available, etc. to other individuals or entities. Payment application 375 may be further configured to determine the existence of and to manage accounts for user 305, as well as create new accounts if necessary, such as the set up and management payments by the user.

Figure 4:
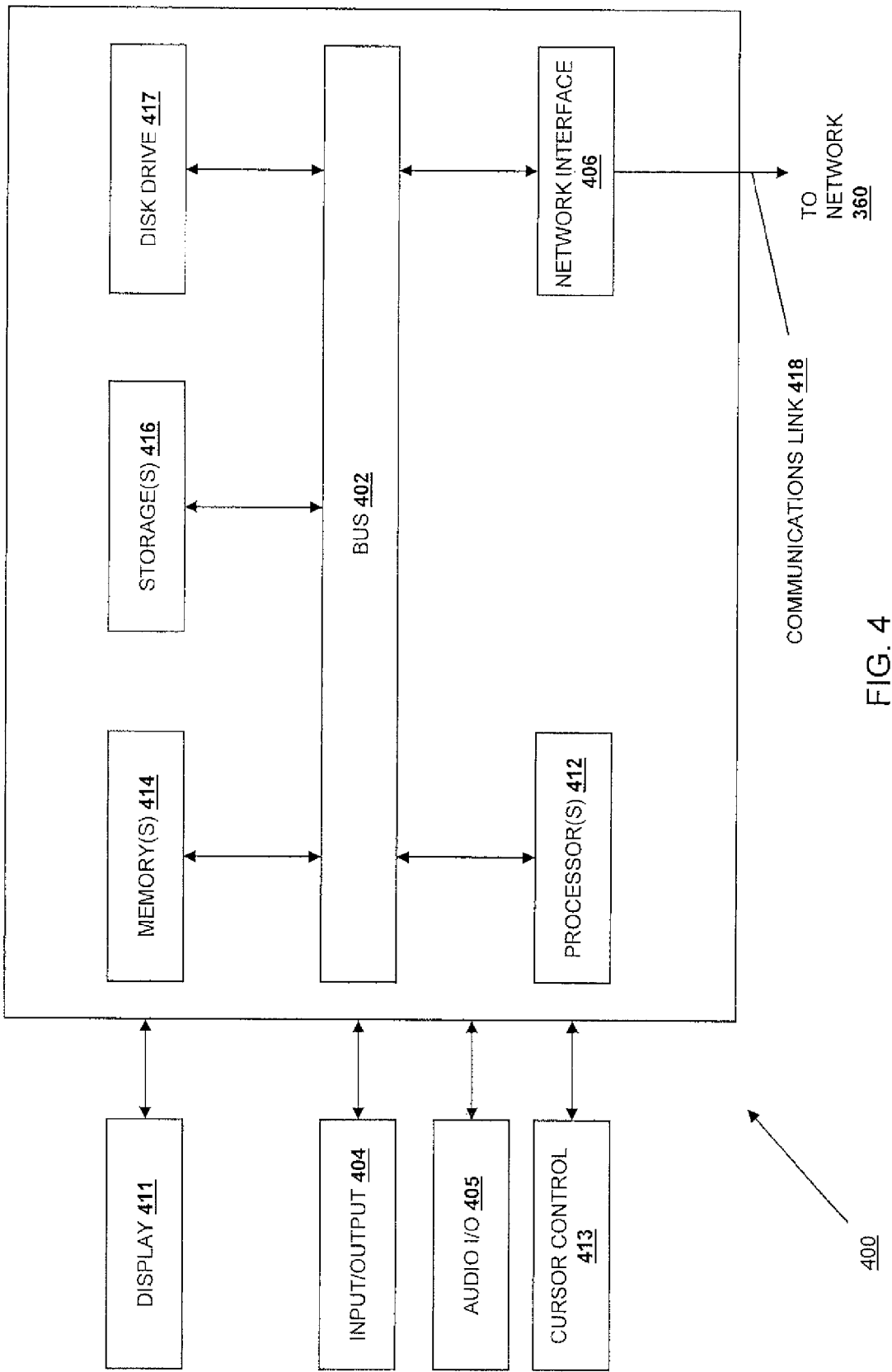
FIG. 4 is a block diagram of a computer system suitable for implementing one or more devices described herein.

FIG. 4 is a block diagram of a computer system 400 suitable for implementing, for example, devices used in the process described herein.

In accordance with various embodiments of the present disclosure, computer system 400, such as a computer and/or a network server, includes a bus 402 or other communication mechanism for communicating information, which interconnects subsystems and components, such as one or more processing components 404 (e.g., processor, micro-controller, digital signal processor (DSP), etc.), one or more system memory components 406 (e.g., RAM), one or more static storage components 408 (e.g., ROM), a disk drive component 410 (e.g., magnetic or optical), a network interface component 412 (e.g., modem or Ethernet card), a display component 414 (e.g., CRT or LCD), an input component 418 (e.g., keyboard, keypad, or virtual keyboard), a cursor control component 420 (e.g., mouse, pointer, or trackball), and/or a location determination component 422 (e.g., a Global Positioning System (GPS), a cell tower triangulation device, and/or a variety of other location determination devices known in the art). In one implementation, disk drive component 310 may comprise a database having one or more disk drive components.

In accordance with embodiments of the present disclosure, computer system 400 performs specific operations by processor(s) 404 executing one or more sequences of instructions contained in memory component(s) 406 or 408, such as described herein with respect to the user device and/or the payment provider device. Such instructions may be read into system memory component 406 from another computer readable medium, such as static storage component(s) 406 or 408 or disk drive component 410. In other embodiments, hard-wired circuitry may be used in place of or in combination with software instructions to implement the present disclosure.

Logic may be encoded in a computer readable medium, which may refer to any medium that participates in providing instructions to processor(s) 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component 410, volatile media includes dynamic memory, such as system memory component(s) 406 or 408, and transmission media includes coaxial cables, copper wire, and fiber optics, including wires that comprise bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by computer system 400. In various other embodiments of the present disclosure, a plurality of computer systems 400 coupled by a communication link 424 to network 310 (e.g., such as a LAN, WLAN, PTSN, and/or various other wired or wireless networks, including telecommunications, mobile, and cellular phone networks) may perform instruction sequences to practice the present disclosure in coordination with one another.

Computer system 400 may transmit and receive messages, data, information and instructions, including one or more programs (i.e., application code) through communication link 424 and network interface component 412. Network interface component 412 may include an antenna, either separate or integrated, to enable transmission and reception via communication link 424. Received program code may be executed by processor(s) 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system comprising:
   a non-transitory memory storing user account information; and
   one or more hardware processors coupled to the non-transitory memory and configured to read instructions from the non-transitory memory to cause the system to perform operations comprising:
     receiving authentication information corresponding to a user;
     determining, from a picture capture corresponding to a physical payment card, a card identifier, wherein the physical payment card is not associated with a user account of the user;
     causing a determination that the card identifier is valid, based at least in part on a database search using the captured card identifier; and
     in response to the determination that the card identifier is valid, creating an association between the physical payment card and the user account of the user.

2. The system of claim 1, wherein the card identifier is contained in a scannable code.

3. The system of claim 2, wherein the scannable code is a QR code or a barcode.

4. The system of claim 1, wherein the card identifier is embossed or printed on the physical payment card.

5. The system of claim 1, wherein the associating comprises storing a card number of the physical payment card in the user account.

6. The system of claim 1, wherein the card identifier is unique to the payment card.

7. The system of claim 1, wherein the card identifier is the same as a card number of the physical payment card.

8. A method comprising:
   receiving, by a hardware processor of a service provider, authentication information corresponding to a user electronically from a user device;
   determining, from a picture capture corresponding to physical payment card, a card identifier, wherein the physical payment card is not associated with an online account of the user with the service provider;
   causing a determination that the card identifier is valid based at least in part on a database search using the captured card identifier; and in response to the determination that the card identifier is valid, creating an association between the physical payment card and the online account of the user with the service provider.

9. The method of claim 8, wherein the card identifier is contained in a scannable code, and wherein the scannable code is a QR code or a barcode.

10. The method of claim 8, wherein the card identifier is unique to the payment card.

11. The method of claim 8, wherein the card identifier is the same as a card number of the physical payment card.

12. A non-transitory machine readable medium having stored thereon machine-readable instructions executable to cause a machine to perform operations comprising:
   receiving, by a service provider, authentication information corresponding to a user electronically from a user device;
   determining, from a picture capture corresponding to physical payment card, a card identifier, wherein the physical payment card is not associated with an account of the user with the service provider;
   causing a determination that the card identifier is valid based at least in part on a database search using the captured card identifier; and
   in response to the determination that the card identifier is valid, creating an association between the physical payment card and the account of the user with the service provider.

13. The non-transitory machine readable medium of claim 12, wherein the card identifier is contained in a scannable image.

14. The non-transitory machine readable medium of claim 12, wherein the card identifier is embossed or printed on the physical payment card.

15. The non-transitory machine readable medium of claim 12, wherein the card identifier is unique to the payment card.

16. The non-transitory machine readable medium of claim 12, wherein the card identifier is the same as a card number of the physical payment card.

* * * * *